United States Patent [19]

Nishigaki et al.

[11] Patent Number: 4,753,906

[45] Date of Patent: Jun. 28, 1988

[54] DIELECTRIC CERAMIC COMPOSITION FOR MICROWAVE APPLICATION

[75] Inventors: Susumu Nishigaki; Shinsuke Yano; Hiroshi Kato, all of Nagoya; Tohru Fuwa, Komaki; Kanji Murano, Nishiminemachi, all of Japan

[73] Assignees: Narumi China Corporation, Nagoya; Sony Corporation, Tokyo, both of Japan

[21] Appl. No.: 924,649

[22] Filed: Oct. 29, 1986

[30] Foreign Application Priority Data

Nov. 7, 1985 [JP] Japan .................. 60-248054

[51] Int. Cl.$^4$ ............... C04B 35/46; C04B 35/49
[52] U.S. Cl. .................... 501/139; 501/137; 501/138
[58] Field of Search ............ 501/139, 134–138

[56] References Cited

U.S. PATENT DOCUMENTS

| | | | |
|---|---|---|---|
| 3,811,937 | 5/1974 | Maher | 117/217 |
| 3,819,990 | 6/1974 | Hayashi et al. | 317/258 |
| 3,988,498 | 10/1976 | Maher | 428/434 |
| 4,242,213 | 12/1980 | Tamura et al. | 501/136 |
| 4,330,631 | 5/1982 | Kawashima et al. | 501/139 |
| 4,522,927 | 6/1985 | Kashima et al. | 501/139 |
| 4,537,865 | 8/1985 | Okabe et al. | 501/135 |
| 4,550,089 | 10/1985 | Ayusawa et al. | 501/139 |
| 4,616,289 | 10/1986 | Itakura et al. | 361/321 |
| 4,621,067 | 11/1986 | Kitoh et al. | 501/136 |
| 4,643,984 | 2/1987 | Abe et al. | 501/134 |
| 4,670,409 | 6/1987 | Okawa et al. | 501/136 |

OTHER PUBLICATIONS

Kolar et al., "Ceramic and Dielectric Properties of Selected Compositions in the BaO–TiO$_2$–Nd$_2$O$_3$ System", *Berichte der Dentchen Keramischen Gesellschaft*, vol. 55, No. 7 (1978), pp. 346–348.

Chemical Abstracts, vol. 102, No. 10, Mar. 11, 1985, Abstract No. 88662a, "Dielectric Ceramics".

Chemical Abstracts, vol. 102, No. 8, Feb. 25, 1985, p. 614, Abstract No. 71290e, "Ceramic Compositions Having High Dielectric Constants".

H. Ohuchi et al., "Dielectric Properties of BaO–Sm$_2$O$_3$–TiO$_2$ Ceramics", 173rd Annual Report of Study Group on Applied Ferroelectrics in Japan.

Ayusawa et al., "High Dielectric Constant Ceramic for Microwave Device", Reported at National Conference Record, 1984, Communication Division, Institute of Electronic and Communication Engineers of Japan.

Nishigaki et al.; "Microwave Dielectric Properties of (Ba,Sr)O–Sm$_2$O$_3$–TiO$_2$ Ceramics", *Ceramic Bulletin*, vol. 66, No. 6 (1987), pp. 1405–1410.

*Primary Examiner*—William R. Dixon, Jr.
*Assistant Examiner*—Andrew B. Griffis
*Attorney, Agent, or Firm*—Flynn, Thiel, Boutell & Tanis

[57] ABSTRACT

A dielectric ceramic composition for microwave applications having the formula $$x\left(\frac{100-n}{100}\text{BaO} \cdot \frac{n}{100}\text{MO}\right) - y\text{TiO}_2 - z\text{R}_2\text{O}_3$$

wherein x, y and z are molar percentages and $10 \leq x \leq 22$, $58 \leq y \leq 80$ and $8 \leq z \leq 22$, $0 < n \leq 25$, and $x+y+z=100$;

M is at least one selected from the group consisting of Sr, Ca and Mg; and

R is at least one selected from the group consisting of Nd, Sm and La.

The dielectric ceramic composition may further contain at least one oxide selected from the group consisting of Cr$_2$O$_3$, Fe$_2$O$_3$, WO$_3$, SnO$_2$ and ZrO$_2$ in the range of more than zero to 5 mole percent based on the total molar percentage of x, y and z and have a superior combination of properties, particularly a high dielectric constant, a large Q and a small τf which adapt them especially to use at the microwave region (wherein Q is the reciprocal of dielectric loss tan δ, i.e., Q=1/tan δ).

8 Claims, 1 Drawing Sheet

FIG. I
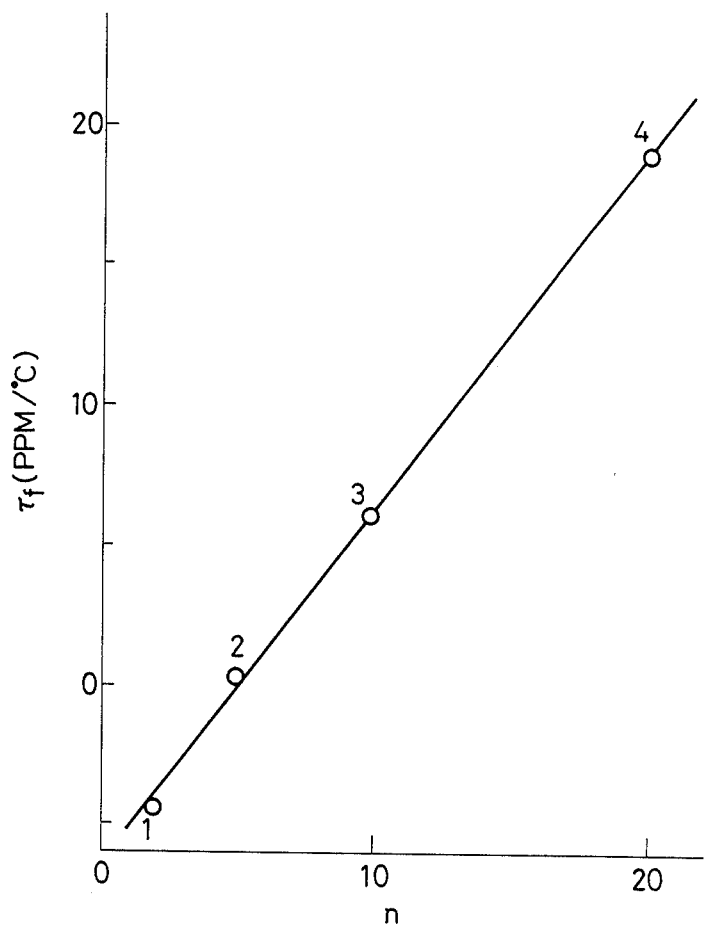
$15(\frac{100-n}{100}BaO \cdot \frac{n}{100}SrO) \cdot 70TiO_2 \cdot 15Sm_2O_3$

DIELECTRIC CERAMIC COMPOSITION FOR MICROWAVE APPLICATION

BACKGROUND OF THE INVENTION

The present invention relates to dielectric ceramic compositions adapted for use at microwave which is especially, but not exclusively, useful for devices or equipment for communication or broadcasting.

In recent years, there have been used dielectric materials having a high dielectric constant, a low dielectric loss and a small temperature coefficient of resonance frequency in resonators. Hereinafter, temperature coefficient of resonance frequency is referred to as "τf". Especially, such materials have been now brought into practical use in communication or broadcasting equipments, such as receivers for a satellite broadcasting or automobile telephone.

$BaO-TiO_2$ or $MgO-CaO-TiO_2$ system dielectric ceramics have heretofore been known in such applications. However, since those heretofore known $BaO-TiO_2$ system or $MgO-CaO-TiO_2$ system dielectrics have a low dielectric constant of the order of 20 to 40, they are disadvantageous in that large dimensions are required because of their low dielectric constant when those dielectrics are employed as resonators at a relatively low frequency region of about 1 GHz. As represented by automobile telephones, currently, there is an increasing demand for dielectric resonators for use in frequencies near 1 GHz and, with this need, much effort or attempts have been made to provide miniaturized resonators. In order to make possible the miniaturization, dielectrics having a high dielectric constant ε, a low dielectric loss and a small τf are required. Particularly, in the case of a coaxial resonator used for automobile telephones, the dielectric constant of a dielectric ceramic used for the coaxial resonator should be sufficiently high without decreasing the Q of the resonator to unacceptable levels (wherein Q is the reciprocal of dielectric loss tan δ, i.e., Q=1/tan δ). More specifically, an increase in the dielectric constant of the dielectric ceramic permits the reduction in the height of the resonator required for the use at the desired resonance frequencies, thereby making possible the miniaturization of the resonator. While in order to minimize deleterious effects due to harmonics, the diameter of the resonator should be reduced, the reduction in the diameter leads to an unfavorable decrease in the Q value of the resonator. Therefore, it is essential that the dielectric ceramic used for the resonator has the highest possible dielectric constant, while the Q value of the resonator has to be kept at the acceptable level from the matter of the design of a resonator, in addition to the requirement that the dielectric ceramic used in the resonator should have a small dielectric loss and a small τf. Such requirements can be satisfied with dielectric materials which make it possible to obtain various desired dielectric constant values with a small dielectric loss and a small τf.

Heretofore, there has been known $BaO-TiO_2-R_2O_3$ system (wherein $R_2O_3$ represents lanthanide oxide) as high dielectric constant materials but among them materials having a sufficiently small τf exhibit a small Q of 2000 to 3000 at 3 GHz and thus result in a large dielectric loss.

Taking as a representative example a $BaO-TiO_2-Sm_2O_3$ system (Japanese Patent Publication No. 59-37 526), materials of fully small τf possess a dielectric constant ε of 75 to 92 and a Q value of 2300 to 2790 at 2.2 to 2.3 GHz ("Dielectric Properties at Microwave Frequencies of the Ceramics in $BaO-Sm_2O_3-TiO_2$ System" presented by S. Kawashima et al., at Am. Ceram. Soc., 87th, Annual Meeting) and, particularly, at 3 GHz their Q value is reduced to an impractical level of 3000 or less and an improved Q has been required.

Therefore, an object of the present invention is to improve the foregoing disadvantages and thereby to provide improved dielectric ceramic compositions having various desired dielectric constant values in a wide range while maintaining a large Q and small τf.

SUMMARY OF THE INVENTION

According to a first feature of the present invention, there are provided dielectric ceramic compositions for microwave application having the formula

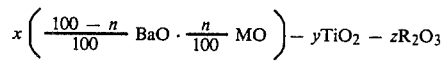

wherein
x, y and z are molar percentages and $10 \leq x \leq 22$, $58 \leq y \leq 80$ and $8 \leq z \leq 22$, $0 < n < 25$ and $x+y+z=100$;
M is at least one selected from the group consisting of Sr, Ca and Mg; and
R is at least one selected from the group consisting of Nd, Sm and La.

A further feature of the present invention resides in dielectric ceramic compositions for microwave applications, the composition comprising
(a) a compound having the formula

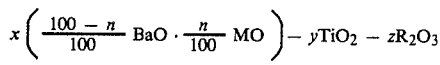

wherein
x, y and z are molar percentage and $10 \leq x \leq 22$, $58 \leq y \leq 80$ and $8 \leq z \leq 22$, $0 < n < 25$, and $x+y+z=100$;
M is at least one selected from the group consisting of Sr, Ca and Mg; and
R is at least one selected from the group consisting of Nd, Sm and La; and
(b) at least one oxide selected from the group consisting of $Cr_2O_3$, $Fe_2O_3$, $WO_3$, $SnO_2$ and $ZrO_2$ in the range of more than zero to 5 mole percent based on the total molar amount of x, y and z.

BRIEF DESCRIPTION OF THE DRAWING

In the drawing, FIG. 1 is a graph showing the relationship between the substituted percentage (n) of SrO and τf.

DETAILED DESCRIPTION OF THE PREFERRED EMBODIMENTS

As previously described, the present invention is directed to the dielectric ceramic composition having the following formula:

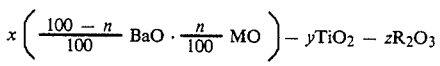

wherein x, y, z, n, M and R are defined previously.

In the foregoing formula, x exceeding 22 mole percent results in an excessively increased $\tau f$ and a reduction in dielectric constant. On the other hand, an insufficient x below 10 mole percent excessively increases $\tau f$.

When the molar percentage, y, is more than 80 mole percent, $\tau f$ becomes too large, while the y value less than 58 mole percent makes sintering difficult and results in an unacceptably large $\tau f$ and the reduction of Q.

When z is more than 22 mole percent, Q is reduced and $\tau f$ is increased, while small z values less than 8 mole percent increases $\tau f$ to an unacceptable level.

Substitution of SrO and/or CaO for BaO within the range above defined enables the controlled change in $\tau f$ and dielectric constant without accompanying an undesirable reduction in Q and thereby can provide various desired dielectric constant values in a wide range while maintaining a small f and a high Q.

Substitution of MgO for BaO is effective to improve Q values when the substitution is in small amounts as above specified. The reason why the amount of the substitution, which is represented by n in the foregoing formula, is limited to a maximum of 25 mole percent is that when the substitution is more than 25 mole percent, $\tau f$ value becomes too large of Q value is greatly reduced.

In the further feature of the present invention, the dielectric ceramic composition further contains at least one oxide selected from the group consisting of $Cr_2O_3$, $Fe_2O_3$, $WO_3$, $SnO_3$ and $ZrO_2$ in amounts of more than zero to 5 mole percent based on the total molar percentage of x, y and z.

The reason of the addition for $Cr_2O_3$, $Fe_2O_3$, $WO_3$, $SnO_2$ and/or $ZrO_2$ is that these additive oxides provide an improved sinterability and further, in a small addition amount, given a favorable effect on Q. As a further beneficial effect, even when the addition amount is increased within the specified range, dielectric constant and $\tau f$ can be adjusted without any detrimental reduction in Q. Thus, the additive oxides help to obtain materials having various desired dielectric constant values over a wide range with while maintaining small $\tau f$ and a high Q.

In the present invention, the most preferable ranges of the x, y and z are $12 \leq x \leq 20$, $65 \leq y \leq 75$ and $10 \leq z \leq 20$.

Now, the present invention will be described in detail with reference to Examples.

EXAMPLE 1

As starting materials $BaCO_3$, $SrCO_3$, $CaCO_3$, MgO, $TiO_2$, $La_2O_3$, $Nd_2O_3$ and $Sm_2O_3$ of high purity were weighed to give the desired compositions, and were wet blended thoroughly in pure water in a polyethylene pot containing alumina balls. The resulting slurry was filtered by means of suction, dried and then calcined in air at temperatures of 850° to 1000° C. for a period of 1 to 6 hours. The calcined material was wet milled with pure water in a polyethylene pot containing alumina balls, filtered by means of suction and then dried. After adding binder to the dried material, the resulting mixture was granulated into a particle size passable through a 70 mesh sieve and then shaped by a compression molding at a pressure of 1,000 kg/cm². The shaped material was fired on a setter, made of zirconia or platinum, at a temperature of 1300° to 1550° C. for a period of 1 to 6 hours in air.

At a frequency of 3 GHz, dielectric constant, reciprocal value Q of dielectric loss tan δ (i.e., Q=1/tan δ), and $\tau f$ (temperature coefficient of resonance frequency) at temperatures of −25° C. to +75° C. were measured for the dielectric ceramic products thus obtained.

Starting materials are not limited only to oxides. Carbonates, such as $BaCO_3$ or $SrCO_3$, and hydroxide, such as $Mg(OH)_2$ may be also used, as long as they are chemically stable and eventually yield oxides.

The compositions and the properties of the above various dielectric ceramic products are listed in Table 1 below. For comparison purposes, the compositions and the properties of Comparative Examples 1 and 2 are also given in Table 1.

TABLE 1

| | | | | | Properties Measured at 3 GHz | | | | | |
|---|---|---|---|---|---|---|---|---|---|---|
| | x*1 | | n*2 | y*3 | z (Percentage of $R_2O_3$) by mol % | | | | Properties | |
| Sample No. | by mol % | MO | by mol % | by mol % | Total | $Sm_2O_3$ | $Nd_2O_3$ | $La_2O_3$ | ε | Q | $\tau f$ ppm/°C. |
| 1 | 15 | SrO | 2 | 70 | 15 | 15 | | | 78 | 3800 | −4 |
| 2 | 15 | SrO | 5 | 70 | 15 | 15 | | | 79 | 3700 | 0 |
| 3 | 15 | SrO | 10 | 70 | 15 | 15 | | | 82 | 3400 | 8 |
| 4 | 15 | SrO | 20 | 70 | 15 | 15 | | | 86 | 3000 | 19 |
| 5 | 14.8 | SrO | 1 | 70.41 | 14.79 | 14.79 | | | 75 | 4000 | −2 |
| 6 | 14.8 | SrO | 2 | 70.41 | 14.79 | 14.79 | | | 76 | 3900 | 1 |
| 7 | 14.8 | SrO | 5 | 70.41 | 14.79 | 14.79 | | | 77 | 3800 | 5 |
| 8 | 17 | SrO | 2 | 70 | 13 | 13 | | | 72 | 4100 | −9 |
| 9 | 17 | SrO | 5 | 70 | 13 | 13 | | | 73 | 4000 | −7 |
| 10 | 17 | SrO | 10 | 70 | 13 | 13 | | | 73 | 3500 | −11 |
| 11 | 17 | SrO | 20 | 70 | 13 | 13 | | | 76 | 3000 | 1 |
| 12 | 11 | SrO | 5 | 78 | 11 | 11 | | | 87 | 4500 | 105 |
| 13 | 15 | CaO | 2 | 70 | 15 | 15 | | | 78 | 3900 | −5 |
| 14 | 15 | CaO | 5 | 70 | 15 | 15 | | | 80 | 3800 | 0 |
| 15 | 15 | CaO | 10 | 70 | 15 | 15 | | | 83 | 3500 | 5 |
| 16 | 15 | CaO | 20 | 70 | 15 | 15 | | | 87 | 3000 | 17 |
| 17 | 14.29 | SrO | 1 | 71.42 | 14.29 | 14.29 | | | 79 | 3900 | 13 |
| 18 | 14.29 | CaO | 1 | 71.42 | 14.29 | 14.29 | | | 79 | 4000 | 12 |
| 19 | 14.29 | MgO | 1 | 71.42 | 14.29 | 14.29 | | | 76 | 4500 | 13 |
| 20 | 15 | SrO | 5 | 70 | 15 | 10 | | 5 | 70 | 3700 | 9 |
| 21 | 14.8 | SrO | 2 | 70.41 | 14.79 | 12.52 | 2.27 | | 77 | 4000 | 5 |
| 22 | 14.29 | SrO | 5 | 71.42 | 14.29 | 7.14 | 7.14 | | 84 | 3900 | 40 |
| 23 | 14.29 | SrO | 5 | 71.42 | 14.29 | 10.71 | | 3.57 | 82 | 3900 | 25 |
| 24 | 14 | SrO | 1 | 68.5 | 17.5 | 8.75 | 8.75 | | 78 | 3800 | 0 |
| 25 | 14 | SrO | 5 | 68.5 | 17.5 | 8.75 | 8.75 | | 78 | 3400 | 4 |
| 26 | 14 | SrO | 10 | 68.5 | 17.5 | 8.75 | 8.75 | | 79 | 3400 | 5 |

TABLE 1-continued

| | | | | | Properties Measured at 3 GHz | | | | | |
|---|---|---|---|---|---|---|---|---|---|---|
| $x^{*1}$ | | | $n^{*2}$ | $y^{*3}$ | z (Percentage of $R_2O_3$) by mol % | | | | Properties | |
| by mol % | | MO | by mol % | by mol % | Total | $Sm_2O_3$ | $Nd_2O_3$ | $La_2O_3$ | $\epsilon$ | Q | $\tau f$ ppm/°C. |
| 27 | | SrO | 2 | 68.5 | 17.5 | 4.38 | 13.12 | | 83 | 3500 | 23 |
| Comparative Examples | | | | | | | | | | | |
| 1 | 16 | SrO | 30 | 68 | 16 | 16 | | | 81 | 708 | 3 |
| 2 | 17.92 | | | 66.78 | 15.3 | 15.3 | | | 78 | 3000 | 0 |

*¹Percentage of (BaO + MO)
*²Percentage of Substitution of MO
*³Percentage of $TiO_2$ As seen from Table 1, substitution of SrO, MgO and/or CaO for part of BaO has been found to change $\tau f$ values and dielectric constant without the reduction of Q. FIG. 1 illustrates the relationship of the percentage (n) of the substitution of SrO to $\tau f$ in which numerals, 1, 2, 3 and 4 correspond to the numbers of samples, respectively. From the foregoing experimental data, it was found that the present invention can provide dielectric ceramics having a high dielectric constant, a small $\tau f$ and a high Q. The values of Q shown in Table 1 are measured at 3 GHz and the results of the measurements measurement results show that Examples of the present invention have Q values of not less than 3000. Such high Q values at 3 GHZ are equivalent to Q values of the order of 1000 or more at 1 GHZ and are sufficient use as resonators.

In Table 1, Comparative Example 1 in which BaO was replaced by a large amount of SrO beyond the range limited in the present invention has a excessively reduced Q. Further, Comparative Example 2 exhibits the properties of $BaO-TiO_2-Sm_2O_3$ ternary system dielectric ceramic with $\tau f=0$ in which the Q of this ceramic was 3000 at 3 GHz.

EXAMPLE 2

Further dielectric ceramics having the compositions given in Table 2 were prepared in the same manner as Example 1 using high pure $BaCO_3$, $SrCO_3$, $CaCO_3$, $Sm_2O_3$, $Nd_2O_3$, $Cr_2O_3$, $Fe_2O_3$, $WO_3$, $SnO_2$ and $ZrO_2$ as starting materials and their properties are also shown in Table 2. In Table 2, x, y, Z and n are the same as defined in Table 1.

As shown in Table 2, addition of $Cr_2O_3$, $Fe_2O_3$, $WO_3$, $SnO_2$ and/or $ZrO_2$ was found to cause change in dielectric constant and a slight change of $\tau f$. The obtained ceramics have proved to have a high dielectric constant, a low $\tau f$ and a high Q. The percentages of additives shown in Table 2 are represented by mole percent based on the total molar amount of BaO, MO, $TiO_2$ and $R_2O_3$.

TABLE 2

| | | | | | Properties Measured at 3 GHz | | | | | | |
|---|---|---|---|---|---|---|---|---|---|---|---|
| Sample No. | $x^{*1}$ by mol % | MO | $n^{*2}$ by mol % | $y^{*3}$ by mol % | z (Percentage of $R_2O_3$) by mol % | | | Additive | | Properties | |
| | | | | | Total | $Sm_2O_3$ | $Nd_2O_3$ | | Amount by mol % | $\epsilon$ | Q | $\tau f$ ppm/°C. |
| 28 | 14.97 | SrO | 2 | 70.06 | 14.97 | 14.97 | | $Cr_2O_3$ | 0.5 | 73 | 4200 | −6 |
| 29 | 14.97 | SrO | 2 | 70.06 | 14.97 | 14.97 | | $Cr_2O_3$ | 1 | 70 | 4100 | −8 |
| 30 | 14.97 | CaO | 10 | 70.06 | 14.97 | 14.97 | | $Cr_2O_3$ | 0.5 | 74 | 3800 | 4 |
| 31 | 14.97 | CaO | 5 | 70.06 | 14.97 | 14.97 | | $Cr_2O_3$ | 1 | 71 | 4100 | −3 |
| 32 | 14.97 | CaO | 5 | 70.06 | 14.97 | 14.97 | | $Cr_2O_3$ | 5 | 67 | 3000 | −5 |
| 33 | 14.97 | SrO | 2 | 70.06 | 14.97 | 11.23 | 3.74 | $Cr_2O_3$ | 1 | 72 | 4000 | 0 |
| 34 | 14.97 | SrO | 5 | 70.06 | 14.97 | 11.23 | 3.74 | $Fe_2O_3$ | 0.5 | 74 | 3900 | 4 |
| 35 | 14.97 | SrO | 5 | 70.06 | 14.97 | 11.23 | 3.74 | $Fe_2O_3$ | 1 | 72 | 3900 | 2 |
| 36 | 17 | SrO | 5 | 70 | 13 | 13 | | $WO_3$ | 0.5 | 65 | 3700 | −6 |
| 37 | 14.8 | SrO | 1 | 70.41 | 14.79 | 14.79 | | $SnO_2$ | 3 | 75 | 3700 | 0 |
| 38 | 14.8 | SrO | 1 | 70.41 | 14.79 | 14.79 | | $ZrO_2$ | 3 | 75 | 3700 | 0 |

*¹Percentage of (BaO + MO)
*²Percentage of Substitution of MO
*³Percentage of $TiO_2$ As described previously, the present invention can provide dielectric ceramic compositions having a wide range of dielectric constant with a high Q (namely, a satisfactorily reduced dielectric loss), and a substantially reduced $\tau f$, by changing the mixing ratio of each component within the range defined in the present invention. Those beneficial properties make the dielectric ceramics of the present invention useful as materials adapted to applications at microwave, such as receiver for a satellite broadcasting, automobile telephone or other communication or broadcasting apparatus at microwave.

Although the dielectric ceramic compositions of the present invention are described and illustrated in reference with microwave applications, they also give good utility in temperature-compensating capacitors or other applications because of its good electrical properties in a low frequency region.

What is claimed is:

1. A dielectric ceramic composition for microwave application consists essentially of a compound having the formula $$x\left(\frac{100-n}{100} BaO \cdot \frac{n}{100} MO\right) - yTiO_2 - zR_2O_3$$

wherein x, y and z are molar percentages and $10 \leq x \leq 22$, $58 \leq y \leq 80$ and $8 \leq z \leq 22$, $0 < n < 25$, and $x+y+z=100$;

M is at least one selected from the group consisting of Sr, Ca and Mg; and

R is at least one selected from the group consisting of Nd, Sm and La.

2. A dielectric ceramic composition for microwave application, the composition consisting essentially of
(a) a compound having the formula

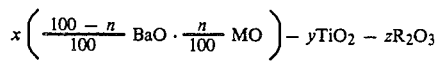

wherein
x, y and z are molar percentages and $10 \leq x \leq 22$, $58 \leq y \leq 80$ and $8 \leq z \leq 22$, $0 < n < 25$, and $x+y+z=100$;
M is at least one selected from the group consisting of Sr, Ca and Mg; and
R is at least one selected from the group consisting of Nd, Sm and La; and
(b) at least one oxide selected from the group consisting of $Cr_2O_3$, $Fe_2O_3$, $WO_3$, $SnO_2$ and $ZrO_2$ in the range of more than zero to 5 mole percent based on the total molar amount of x, y and z.

3. A dielectric ceramic composition as claimed in claim 1 in which said x, y and z are $12 \leq x \leq 20$, $65 \leq y \leq 75$ and $10 \leq z \leq 20$, respectively.

4. A dielectric ceramic composition as claimed in claim 2 in which said x, y and z are $12 \leq x \leq 20$, $65 \leq y \leq 75$ and $10 \leq z \leq 20$, respectively.

5. A dielectric ceramic composition as claimed in claim 3 in which $1 \leq n \leq 20$.

6. A dielectric ceramic composition as claimed in claim 4 in which $1 \leq n \leq 10$.

7. A dielectric ceramic composition as claimed in claim 5 in which said x, y and z are $14 \leq x \leq 17$, $68.5 \leq y \leq 71.42$ and $13 \leq z \leq 17.5$.

8. A dielectric ceramic composition as claimed in claim 6 in which x, y and z are $14.8 \leq x \leq 17$, $70 \leq y \leq 70.41$ and $13 \leq z \leq 14.97$.

* * * * *

UNITED STATES PATENT AND TRADEMARK OFFICE
CERTIFICATE OF CORRECTION

PATENT NO. : 4,753,906

DATED : June 28, 1988

INVENTOR(S) : Susumu NISHIGAKI et al

It is certified that error appears in the above-identified patent and that said Letters Patent is hereby corrected as shown below:

Column 6, Line 56; change "consists" to ---consisting---.

Column 6, Line 65; change "$0<n<25$" to ---$0<n\leq 25$---.

Column 7, Line 13; change "$0<n<25$" to ---$0<n\leq 25$---.

Signed and Sealed this

Twenty-second Day of November, 1988

Attest:

DONALD J. QUIGG

*Attesting Officer*  *Commissioner of Patents and Trademarks*